(12) United States Patent
Thulasidoss et al.

(10) Patent No.: US 12,717,317 B2
(45) Date of Patent: Aug. 25, 2026

(54) SYSTEM AND METHOD FOR PREDICTIVE VISUALIZATION IN AN INDUSTRIAL APPLICATION

(71) Applicant: Datifex Inc., Toronto (CA)

(72) Inventors: Rajasekaran Thulasidoss, Summerside (CA); Christopher Erickson, Toronto (CA); Sathesh Jayachandran, Mahagadu (IN)

(73) Assignee: DATIFEX INC. (CA)

( * ) Notice: Subject to any disclaimer, the term of this patent is extended or adjusted under 35 U.S.C. 154(b) by 511 days.

(21) Appl. No.: 18/161,812

(22) Filed: Jan. 30, 2023

(65) Prior Publication Data

US 2024/0255934 A1 Aug. 1, 2024

(51) Int. Cl.

| | |
|---|---|
| ***G05B 19/418*** | (2006.01) |
| ***G05B 17/02*** | (2006.01) |
| ***G06F 16/44*** | (2019.01) |
| ***G06Q 10/109*** | (2023.01) |

(52) U.S. Cl.

CPC ....... *G05B 19/41885* (2013.01); *G05B 17/02* (2013.01); *G06Q 10/1097* (2013.01); *G06F 16/444* (2019.01)

(58) Field of Classification Search

CPC ............. G06Q 10/047; G06Q 10/1097; G06Q 10/063116; G06Q 10/063114; G05B 19/41895; G05B 15/02; G05B 23/02; G05B 17/02; G06F 16/489; G06F 16/487; G06F 16/444

USPC ................................ 700/97, 11, 17; 345/958

See application file for complete search history.

(56) References Cited

U.S. PATENT DOCUMENTS

| | | | | |
|---|---|---|---|---|
| 10,445,702 | B1 * | 10/2019 | Hunt | G06Q 10/1097 |
| 10,528,920 | B2 * | 1/2020 | Cronin | G06F 16/955 |
| 2016/0132836 | A1 * | 5/2016 | Cronin | G06Q 20/202 705/7.19 |
| 2019/0172020 | A1 * | 6/2019 | Spear | G16H 10/60 |

(Continued)

FOREIGN PATENT DOCUMENTS

| | | | | | |
|---|---|---|---|---|---|
| CN | 107103751 | B | * | 4/2020 | G08G 1/00 |
| CN | 118247972 | A | * | 6/2024 | |
| CN | 118247972 | B | * | 8/2024 | |

(Continued)

*Primary Examiner* — Ronald D Hartman, Jr.

(74) *Attorney, Agent, or Firm* — Thorpe North & Western, LLP.

(57) ABSTRACT

A system and method for generating and configuring predictive visualizations for industrial applications. The system comprises a module configured to load a user venue comprising a digital rendering of the industrial application and a plurality of digital models in the industrial application; a module configured to create a radiating chit based on a user defined activity for each digital model in the user venue; a module configured to generate an instance of a data layer for the user venue; a module configured to determine if the user defined activities are scheduled on overlapping times, and based on the schedule, proceeding with the user defined activity or creating a radiating mesh for the respective digital models defined in the venue; a module configured to determine a collision between the digital models utilizing the radiating meshes; and a module configured to visualize the collision on the digital rendering of the user venue.

20 Claims, 11 Drawing Sheets

(56) References Cited

U.S. PATENT DOCUMENTS

| | | | | |
|---|---|---|---|---|
| 2023/0351282 | A1 * | 11/2023 | Uren ................ | G06Q 10/06312 |
| 2024/0354865 | A1 * | 10/2024 | King ................ | G06Q 10/06393 |

FOREIGN PATENT DOCUMENTS

| | | | | | |
|---|---|---|---|---|---|
| KR | 1663106 | B1 * | 10/2016 | ........... | G06Q 10/103 |
| RU | 2801709 | C1 * | 8/2023 | | |
| WO | WO-2021030513 | A1 * | 2/2021 | ........... | G06F 16/338 |
| WO | WO-2023056545 | A1 * | 4/2023 | ........... | G06F 3/0486 |

* cited by examiner

Figure 3:
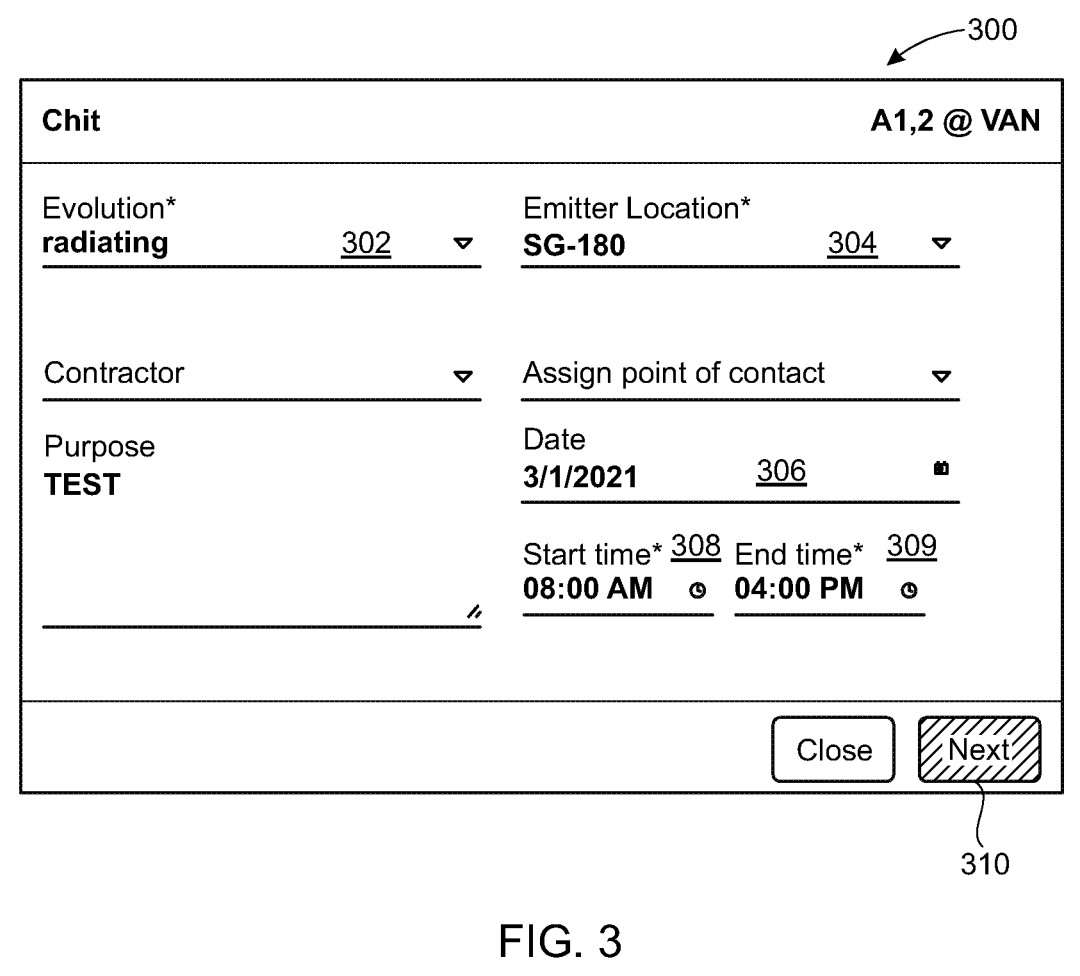

300

Chit A1,2 @ VAN

Evolution*
radiating 302

Emitter Location*
SG-180 304

Contractor

Assign point of contact

Purpose
TEST

Date
3/1/2021 306

Start time* 308
08:00 AM

End time* 309
04:00 PM

Close

Next

SYSTEM AND METHOD FOR PREDICTIVE VISUALIZATION IN AN INDUSTRIAL APPLICATION

FIELD OF THE INVENTION

The present invention relates to computer systems and more particularly, to a system and method for predictive visualization in an industrial application.

BACKGROUND OF THE INVENTION

In the art, there are numerous industries and scenarios involving the movement of large multiple vessels, aircraft, rail cars, construction equipment and other heavy machinery, containers, and the like, in a venue. Collision avoidance is largely reliant on the skill and situational awareness of the craft and machinery operators. This leaves the possibility of human error. Un-intended collisions in a venue typically result in extensive damage and repair costs not to mention the downtime while vessels and/or a venue such as a shipyard are being repaired and recommissioned.

Accordingly, there remains a need for improvements in the art for collision detection systems, and collision detection systems configurable for a variety of venues.

BRIEF SUMMARY OF THE INVENTION

The present disclosure is directed to a method and system for predictive visualization in an industrial application. The system and method for predictive visualization being configurable for a variety of different types of venues and/or applications.

According to an embodiment, there is provided a computer-implemented process for predictive visualization in an industrial application, said computer-implemented process comprising the steps of: loading a venue comprising a digital rendering of the industrial application and comprising a plurality of digital models representing objects in the industrial application; creating a radiating chit based on a user defined activity for each of said plurality of digital models in said venue; generating an instance of data layer corresponding to said venue; determining if any of said user defined activities are scheduled on overlapping times, and if none of said user defined activities are scheduled on time, proceeding with said user defined activity, and if any one of said user defined activities are scheduled on time, creating a radiating mesh for each of said digital models defined in said venue; utilizing said radiating meshes to determine a collision, if a collision is not found, proceeding with said user defined activity, and if a collision is found, notifying the user about the collision; and visualizing the collision on the digital rendering of said venue.

According to another embodiment, there is provided a computer program product for predictive visualization in an industrial application, said computer program product comprising: a storage medium configured to store computer readable instructions; said computer readable instructions including instructions for, loading a venue comprising a digital rendering of the industrial application and comprising a plurality of digital models representing objects in the industrial application; creating a radiating chit based on a user defined activity for each of said plurality of digital models in said venue; generating an instance of data layer corresponding to said venue; determining if any of said user defined activities are scheduled on overlapping times, and if none of said user defined activities are scheduled on time, proceeding with said user defined activity, and if any one of said user defined activities are scheduled on time, creating a radiating mesh for each of said digital models defined in said venue; utilizing said radiating meshes to determine a collision, if a collision is not found, proceeding with said user defined activity, and if a collision is found, notifying the user about the collision; and visualizing the collision on the digital rendering of said venue.

According to another embodiment, there is provided a system for predictive visualization in an industrial application, said system comprising: a module configured to load a user venue comprising a digital rendering of the industrial application and comprising a plurality of digital models representing objects in the industrial application; a module configured to create a radiating chit based on a user defined activity for each of said plurality of digital models in said user venue; a module configured to generate an instance of a data layer corresponding to said user venue; a module configured to determine if any of said user defined activities are scheduled on overlapping times, and if none of said user defined activities are scheduled on time, proceeding with said user defined activity, and if any one of said user defined activities are scheduled on time, said module being configured to create a radiating mesh for each of said respective digital models defined in said venue; a module configured to determine a collision between one or more of said digital models utilizing said radiating meshes, if a collision is not found, proceeding with said user defined activity, and said module being configured to issue a notification if a collision is found; and a module configured to visualize the collision on the digital rendering of said user venue.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which:

FIG. 3 is a screenshot of an exemplary implementation of a radiation chit configuration window;

Like reference numerals indicate like or corresponding elements or components in the drawings.

DETAILED DESCRIPTION OF THE EMBODIMENTS OF THE INVENTION

Embodiments according to the present disclosure are described below by way of block diagrams and flowcharts, and/or screen shots that would be displayed to a user of the system. The screen shots comprise exemplary implementations of a predictive visualization system and/or functions or features embodied or executed by the predictive visualization system, as will be described in more detail below. The predictive visualization system is described according to an exemplary implementation or application comprising a navy shipyard. It is however to be appreciated that the predictive visualization system according to the present disclosure is suitable for other marine applications, and industrial applications such as a shipping container facility, a railway yard, industrial parts delivery system in a manufacturing facility, and other industries.

Figure 1:
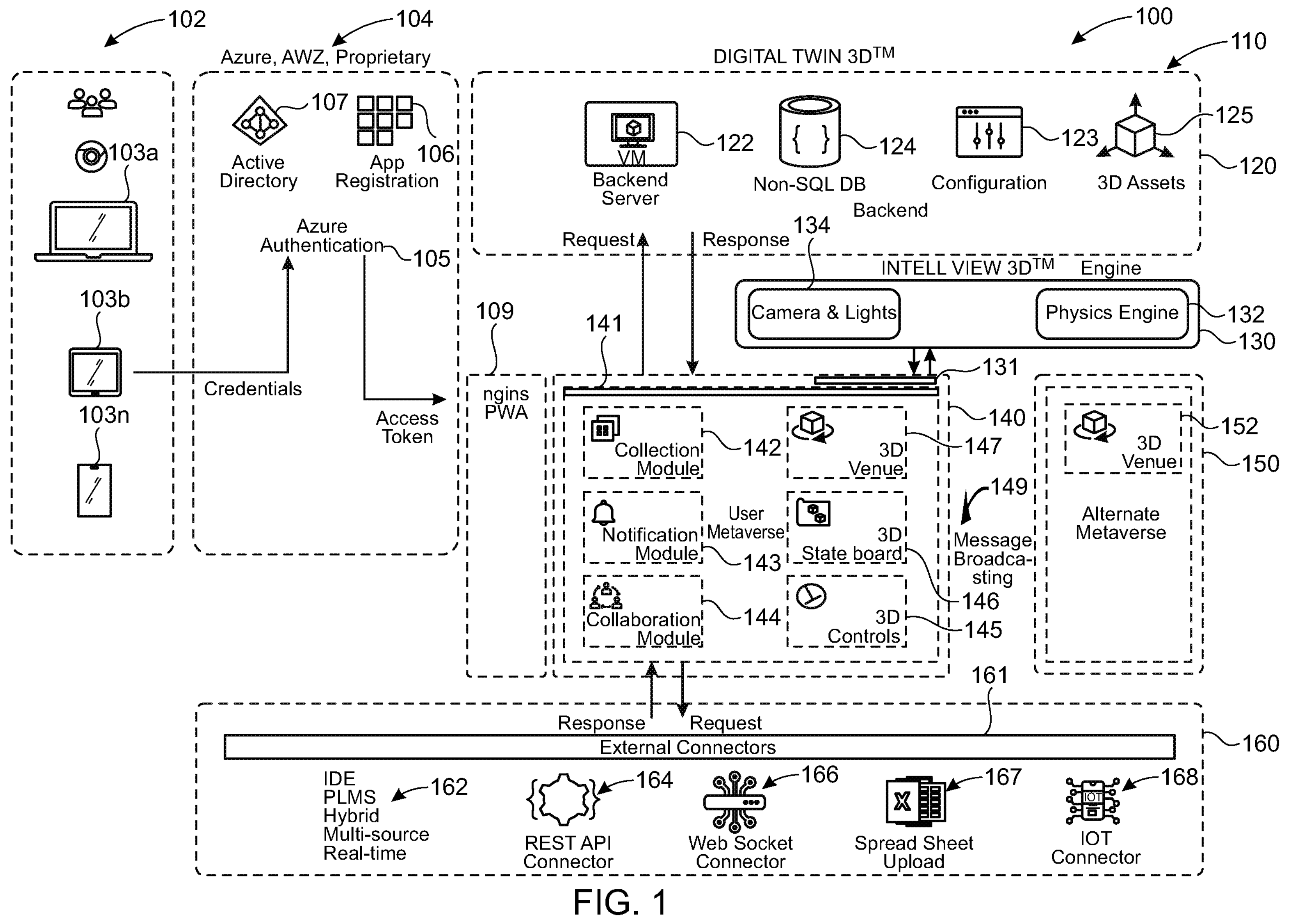
FIG. 1 shows in diagrammatic form an exemplary system for predictive visualization in an industrial application according to an embodiment of the present disclosure.

Reference is made to FIG. 1, which shows in diagrammatic form an exemplary operating environment and configuration for implementing and practising a system and processes according to embodiments of the present invention. The operating environment according to an embodiment and indicated generally by reference 100 and comprises a predictive visualization system indicated generally by reference 110. According to an exemplary configuration the system is configured as a cloud-based application. As shown, one or more clients, i.e. users, 102, indicated individually by client devices 103*a*, 103*b* . . . 103*n*, access the system 110 through a cloud-based platform or application indicated generally by reference 104 through the Internet or other network.

The cloud-based application can be configured using the Azure™ application from Microsoft™, Amazon Web Services (AWS) from Amazon™ or a proprietary system, as will be within the understanding of those skilled in the art. According an exemplary implementation, the cloud-based module 104 is implemented using Azure from Microsoft and comprises an Azure authentication layer 105, an App registration component 106 and an Active Directory 107, as shown in FIG. 1. In known manner, the App registration component 106 and the Active Directory 107 register a user 102 through an application, e.g. "App", installed and configured on the user device 103. Credentials from the user devices 103 are authenticated utilizing the Azure authentication layer 105 and access token is generated to allow the user 102 to access the predictive visualization system 110, through a web server indicated generally by reference 109. According to an exemplary implementation, the web server 109 comprises a NGINX webserver. In known manner, users 102 may be assigned or given varying levels of access privileges.

According to an exemplary embodiment, the predictive visualization system 110 is configured as a web or browser application configured to run on the web browser installed in a user computer, tablet or other computing device and comprises a digital twin module 120 and a visualization generation engine 130, a user metaverse module indicated generally by reference 140 and an alternate metaverse module indicated generally by reference 150.

According to an exemplary embodiment, the digital twin module 120 is implemented as a web application. The digital twin module 120 is configured to store data and information associated with an application configuration (e.g. a navy shipyard application). As shown in FIG. 1, the digital twin module 120 comprises a backend server 122 and a non-SQL server 124. The non-SQL server 124 is implemented utilizing an Azure Cosmos Non-SQL database server and configured to store project configuration data indicated by reference 125, 3D assets (e.g. 3D mesh layer structures) indicated generally by reference 125 and other user specific data. The backend server 122 is configured to host a node server on a VM (Virtual Machine) with REST API interfaces configured to exchange data back and forth with the Non-SQL database server 124. The configuration data 123 further comprises a project configuration module. According to an exemplary implementation, the project configuration module comprises a predetermined set of parameters for camera, lighting, venue colours and a path or route to the backend server 122. The project configuration module includes a route to all static models and settings, such as, default location, size and mesh color. According to another aspect, the project configuration module is configured to define a project workspace, which serves to keep the code base flexible and adaptable to support various project/application requirements. The 3D assets module 125 comprises a repository of the 3D mesh layer structures and models used according to the project configuration module. The particular implementation details will be within the understanding of one skilled in the art.

The visualization generation engine 130 comprises a module configured to generate or build a 3D immersive web environment, i.e. a 3D venue, for an industrial application, for example, a navy shipyard application. The visualization engine 130 comprises a physics engine indicated generally by reference 132 in FIG. 1. According to an embodiment, the physics engine 132 is implemented utilizing a 3D engine, for instance, Babylon JS from Microsoft. Babylon.js is a real time 3D engine using a JavaScript library for displaying 3D graphics in a web browser via HTML5. The visualization generation module 130 is configured to allow a user to create a 3D immersive online applications without necessarily having to study or deal with any of the physics or concepts, such as vectors, indices, cameras, lighting, etc. For instance, the visualization generation module 130 is configured to allow a user to build a 3D immersive online application for an industrial application, e.g. a navy shipyard, by adding 3D elements to a space, modifying properties, applying transition effects for animation, processing mouse events, i.e. inputs, on meshes, like Left Click, Right Click, Mouse Up, Mouse Down, Hover On, Hover Off, and create planes.

According to another aspect, the visualization generation module 130 is configured to use an optimized low poly mesh as the default ground. The generation module 130 comprises an animation API configured to animate and move/rotate any 3D object from one state to another state and the physics engine 132 is configured to handle complex tasks and operations, such as fixing the camera, creating the animation instance, setting the mesh properties, computing the speed and duration of animation, and creating events to start and stop the animation. According to another aspect, the visualization generation module 130 is configured to provide the capability to burst an item into smaller components depend on mesh layering. According to another aspect, the visualization generation module 130 includes user interfaces (GUI) configured to allow a user to drag and attach objects, to rotate any single object in 360 degrees, while the rest of the area remains static. These and other features are described in more detail below in the context of exemplary applications and/or operations. The particular implementations again will be within the understanding of one skilled in the art.

The visualization generation engine 130 also comprises the camera & lights module 134. According to an embodiment, the camera & lights module 134 comprises camera and lighting interfaces designed for industrial applications, for instance, a navy shipyard according to an exemplary implementation. The camera & lights module 134 comprises a number of preset lights comprising high and low intensity lights, with the intensities being tailored and/or defined for the application in a particular venue. Furthermore, the capability is provided to customize the performance and/or parameters of one or more lights, based on particular lighting characteristics or requirements of a project or venue. According to an exemplary implementation, the camera & lights module 134 includes a camera configuration for use in industrial web applications, this comprises a fixed camera, for instance, when the application needs to move and focus on a particular position; a moving camera, for instance, when the application needs to follow an object in space; an arc rotation camera, for instance, when the user rotates and pans; and a custom camera to centre the object in space in response to user click or input.

Referring back to FIG. 1, the user metaverse module or application 140 comprises a front-end or interface component indicated by reference 141 and configured to interface to the digital twin module 120 and provide a communication channel or path for sending requests and receiving responses including data/information.

As shown, the user metaverse application 140 comprises the following components or functional modules, a collection module 142, a notifications module 143, a collaboration module 144, a 3D controls module 145, a 3D skateboard module 146 and a 3D venue module 147. As will be described in more detail below, user interaction events are captured on the 3D environment and dispatched to the other components via a message broadcasting service. The user metaverse application 140, i.e. one or more modules, uses the REST API layer in the backend server 122 to store and retrieve data.

As shown, the user metaverse module 140 includes a DataUX View component indicated by reference 131, which is configured to communicate with the visualization generation engine 130.

The DataUX View component 131 is configured to provide primary interfaces, requests and responses from the 3D digital models to the visualization engine 130, and render and control every event that takes place in the 3D venue space. Exemplary requests from the 3D digital model include user interactions or inputs, for instance, left and/or right "clicks" on mesh layers, mouse "clicks", "hover over" on mesh layers. The functional application modules in the user metaverse application 140 are configured to utilize standard REST API Requests to the VM backend server 122 to store and retrieve data like user role and access information, 3D models meta data, and the like.

The collection module 142 is configured to provide an agnostic mechanism to capture meta data for varying use cases. The meta data comprises chits/activities, lockout tag out, flex etc. The information is encapsulated inside a key in the JSON structure with other data including status, user associated/assigned, date or creation, group/category. The meta data collection is sent to the backend server 122 via the DATAUX view component 141.

The notification module 143 comprises a number of web socket listeners, with each socket configured to keep track of messages sent to a user that is currently active. When a new piece of data is added to the collection module 142, or when a conflict needs to be reported to a set of users, the user metaverse application 140 is configured to send information to the notification module 143. The notification module 143 is configured to evaluate the request and deliver the notification to the appropriate user over the web socket. The notification module 143, which is listening on the destination user, receives, processes, and communicates the information to the user. The notification module 143 is also configured to keep track of active and inactive users, while also queuing up alerts in a queue configured on the backend server 122. The queue is empty as soon as the user reads and deletes the messages.

The collaboration module 144 comprises a functional module configured to connect the 3D models in the 3D environment, i.e. the 3D Venue module 147, with the data in the collection module 142. According to an exemplary implementation, a JSON data structure is configured for storing a mesh location where the data is mapped, a reference to user data from the collection module 142, and a 3D object used to represent the data on the venue (in the 3D Venue 147) are all handled by the collaboration module 144. The collaboration module 144 is further configured to create a user's data collection comprising a name, a 3D object to represent the data, and a placement of the 3D object on the venue. The placement or location of the 3D object comprises a mesh point or a position the user chooses on the venue, or the placement may comprise a predetermined location in the 3D venue. For instance in a navy shipyard application, a user may build a collection named 'Rounds in the Navy Duty Watch program' to record the audit of inspections performed on arm ammunition.

The 3D Venue module 147 is configured to provide a datascape layer instance of the visualization engine 130 that holds and renders the 3D models. According to an exemplary implementation, the ground plane, camera and lights are read from the project configuration file stored on the backend server 122 on the digital twin module 110, and provided as inputs to the 3D venue module 147 in the user metaverse application 140. According to another aspect, the mesh configuration JSON holds the mesh structures for static and dynamic models, and the same data provided as input to the 3D venue module 147 to create and render the static and dynamic models as per the specification.

The 3D Stateboard 146 comprises an array of structures stored in the database on the backend server 122 that is configured to hold references to the meta data collection. The 3D Stateboard module 146 is configured to provide a set of widget holders in a user interface (GUI) in the application for users to assign the meta data collection against the widget holder. The meta data collection is listed and shown on the widgets in the user interface. The user interface is configured to be responsive to a user click one of the widgets with meta data, the application is configured to find the 3D mesh referenced by the selected meta data, and broadcasts the relevant messages to the 3D venue module 147 to move camera, zoom and/or center the associated 3D model on the space.

The 3D control module 145 comprises a user interface (UI) component of the user interface (GUI) for the application and according to an implementation is configured with a set of buttons integrated on the 3D venue display visualization (i.e. window or screen) or rendering and configured for the user to navigate the 3D venue on user input(s), e.g. clicks. The 3D control component or module 145 is configured to translate the user event or input to respective messages and then broadcast the messages, e.g. as control commands, to the camera module 134 in the visualization engine 120. The camera module 134 is configured to process the message(s) and navigate the 3D venue as required. According to an exemplary implementation, the default controls for the projects are Zoom In, Zoom Out, 3D/2D toggle, Home, Reset etc. Additional controls such as drag, explode and additional camera positions can be configured as required.

According to another aspect, the user metaverse application 140 includes a message broadcasting service indicated generally by reference 149 in FIG. 1. The message broadcasting service 149 is configured to provide communication channels and communication links for exchanging information and data between the components and functional modules comprising the user metaverse application 140. According to an exemplary implementation, each UI and functional component subscribes to the message broadcasting service, and listens to it collectively rather than requiring separate subscribers and listeners for each component. The message content can be specific or it can be generic. According to an exemplary implementation, the message broadcasting service is configured to record user actions received from the 3D control component 145 and broadcasting messages including Zoom in/out, home, etc. The Camera component or module 134 is configured to listen to the message broadcasting service 149 and act on the events, e.g. commands or instructions, comprising the message content.

Referring back to FIG. 1, the user metaverse application 140 includes a port 161 for interfacing to external connections indicated generally by reference 160. The core application module has a design layer for integrating any external software/hardware using the connectors. The application includes standard connectors including the REST API 164, Web Socket/UDP Socket 166, and Spreadsheet Reader 167. The application's default connectors enable integration with any REST API provided by the other applications, data exchange with 3$^{rd}$ party software/devices via web socket/udp socket protocols, or spreadsheet input for rendering metadata and visualizing 3D models. Additionally, the application has the capabilities to interface with protocols such as IOT 168.

Figure 2A:
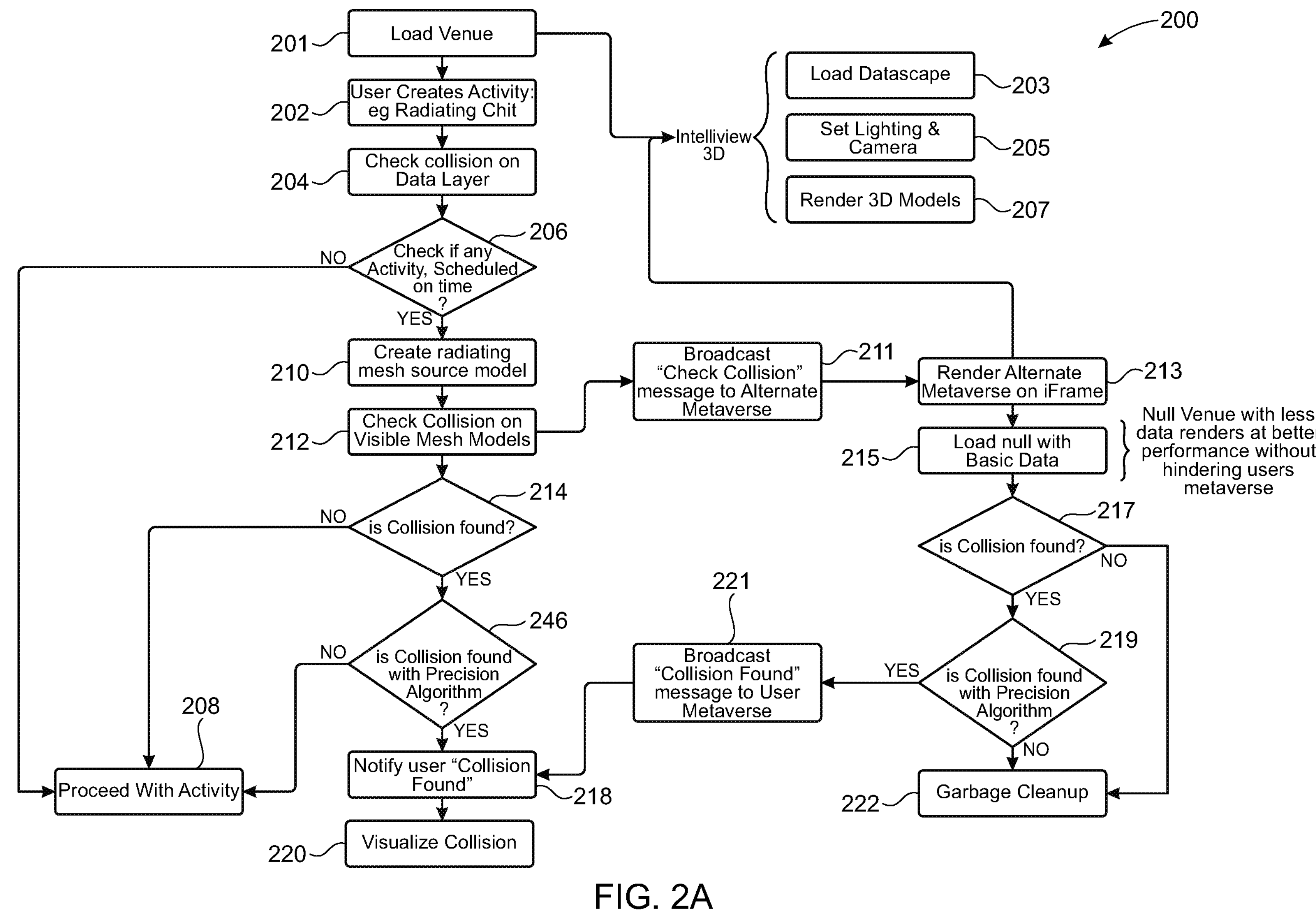
FIG. 2A shows in flowchart form a process or method for predictive visualization according to an implementation of the present disclosure.

Reference is next made to FIG. 2A, which shows in flowchart form a process or method for predictive visualization and collision detection according to an implementation of the present disclosure and indicated generally by reference 200.

Figure 2B:
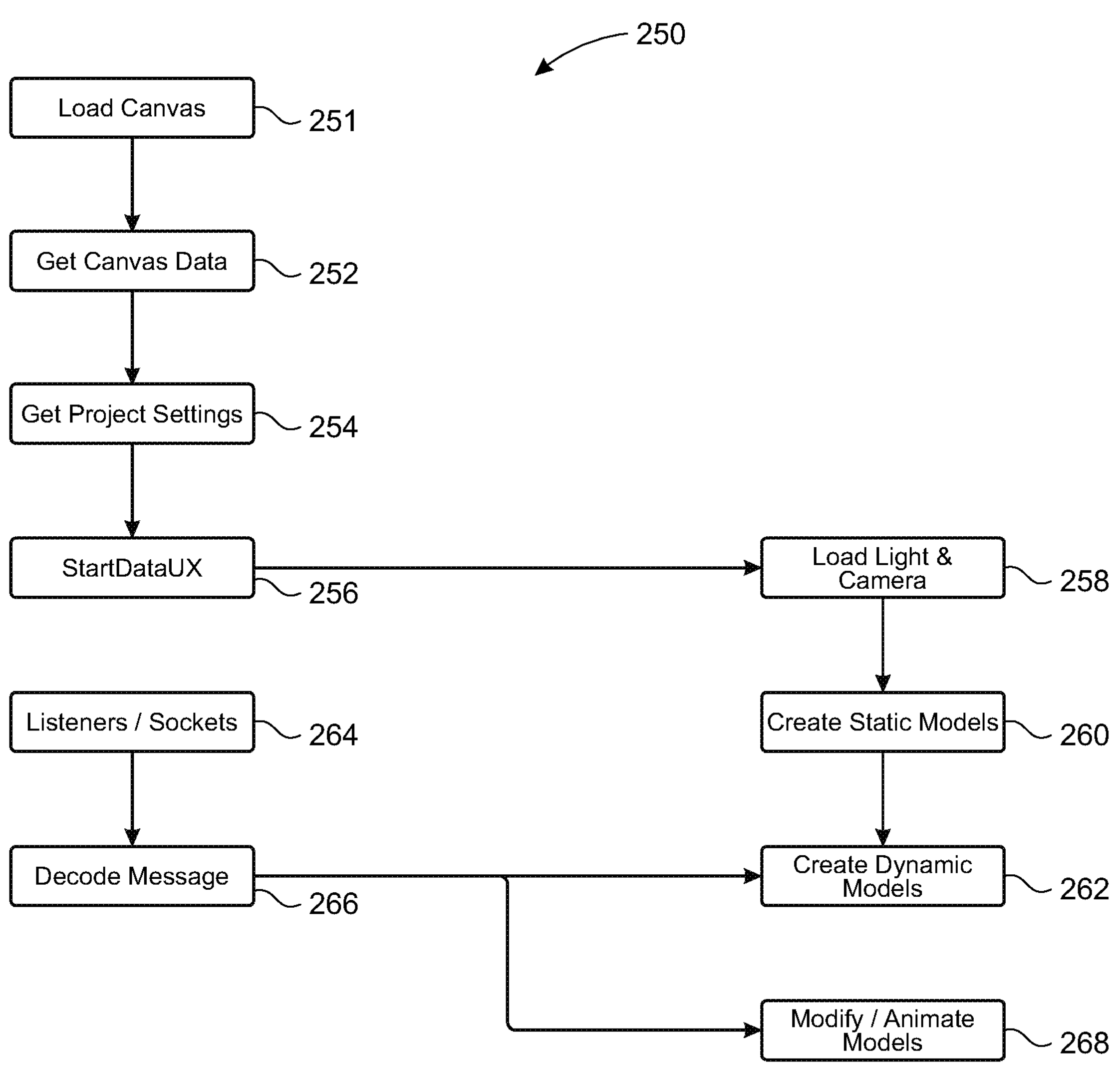
FIG. 2B shows in flowchart form a process or method for loading a venue according to an implementation of the present disclosure.

As shown in FIG. 2A, the predictive visualization process 200 comprises a Load Venue step or process as indicated by reference 201. According to an exemplary implementation, the predictive visualization system 100, i.e. the visualization engine or application 130 (FIG. 1), is configured to load standard 3D file formats, such as, glb, gltf, obj, and Babylon. The load venue function in block 201 comprises the visualization engine loading a datascape in block 203, setting lighting and camera in block 205 and rendering 3D models in block 207, as shown in FIG. 2A. The visualization engine application 130 comprises one or more sockets which are configured to listen to message broadcasts and in response is configured to create, move, and/or animate models on the 3D venue. Reference is made to FIG. 2B, which shows a process indicated generally by reference 250 for modelling the 3D venue and rendering the 3D venue. As shown in FIG. 2B, the process for modelling and rendering 250 comprises a load canvas operation indicated by reference 251 which comprises a get canvas data step 252 and a get project setting step 254. The next step indicated by reference 256 comprises starting the DataUX view component, which is followed by a load light & camera operation indicated by reference 258. The visualization application 130 is configured to create one or more static models 260 and one or more dynamic models as indicated by reference 262, based on loaded information and any other parameters or inputs. According to another aspect, the application 130 is configured with listeners or sockets to listen to broadcast messages 264 and decode messages (or selected messages) 266. Based on the content of the decoded message(s) additional or new dynamic models can be created in block 262, or the model(s) can be modified or animated as indicated by reference 268.

Figure 4:
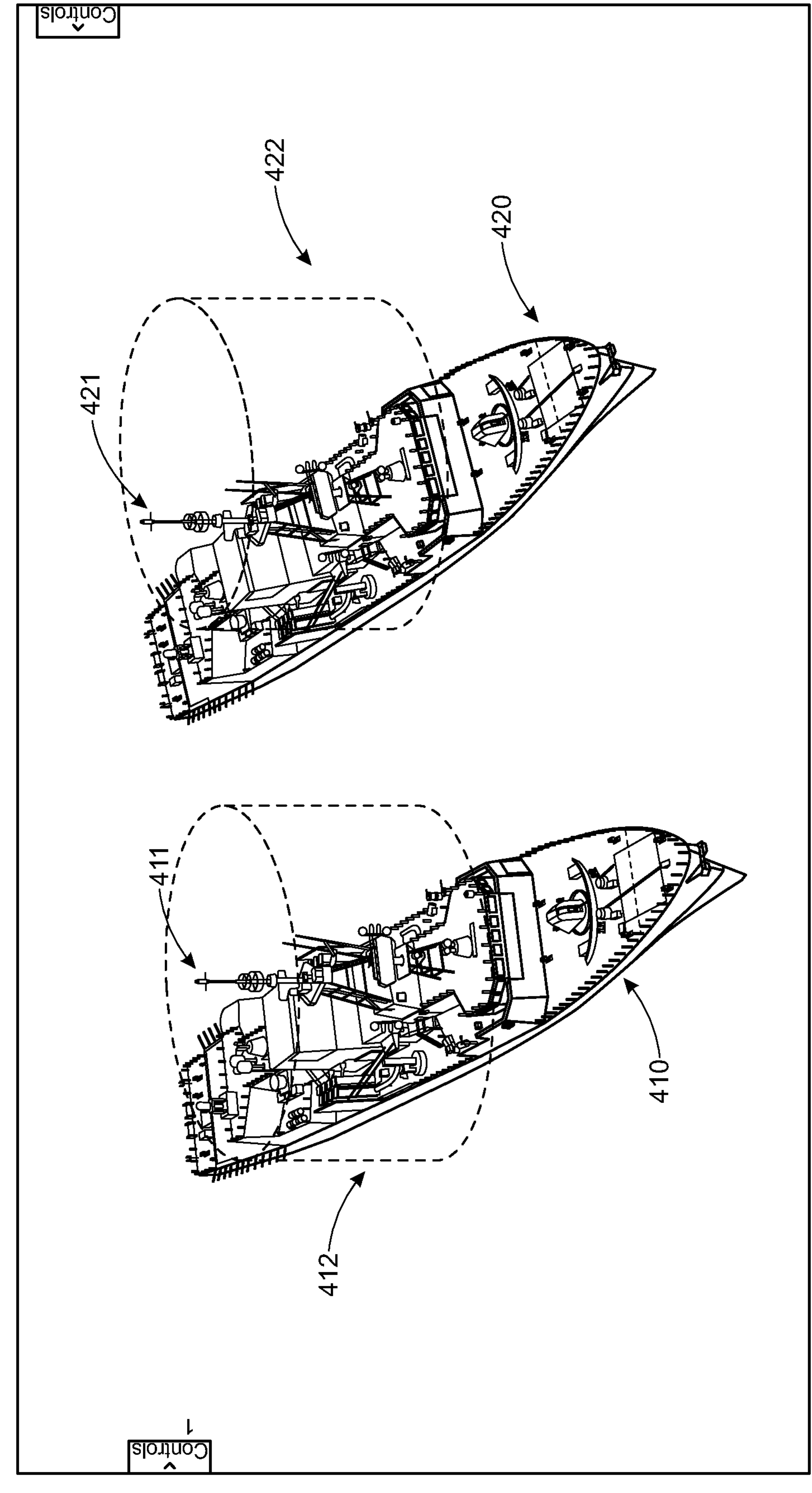
FIG. 4 is a screenshot of a 3D rendering of two ships in a navy shipyard application with respective radiating meshes generated according to an implementation of the present disclosure.
Figure 7A:
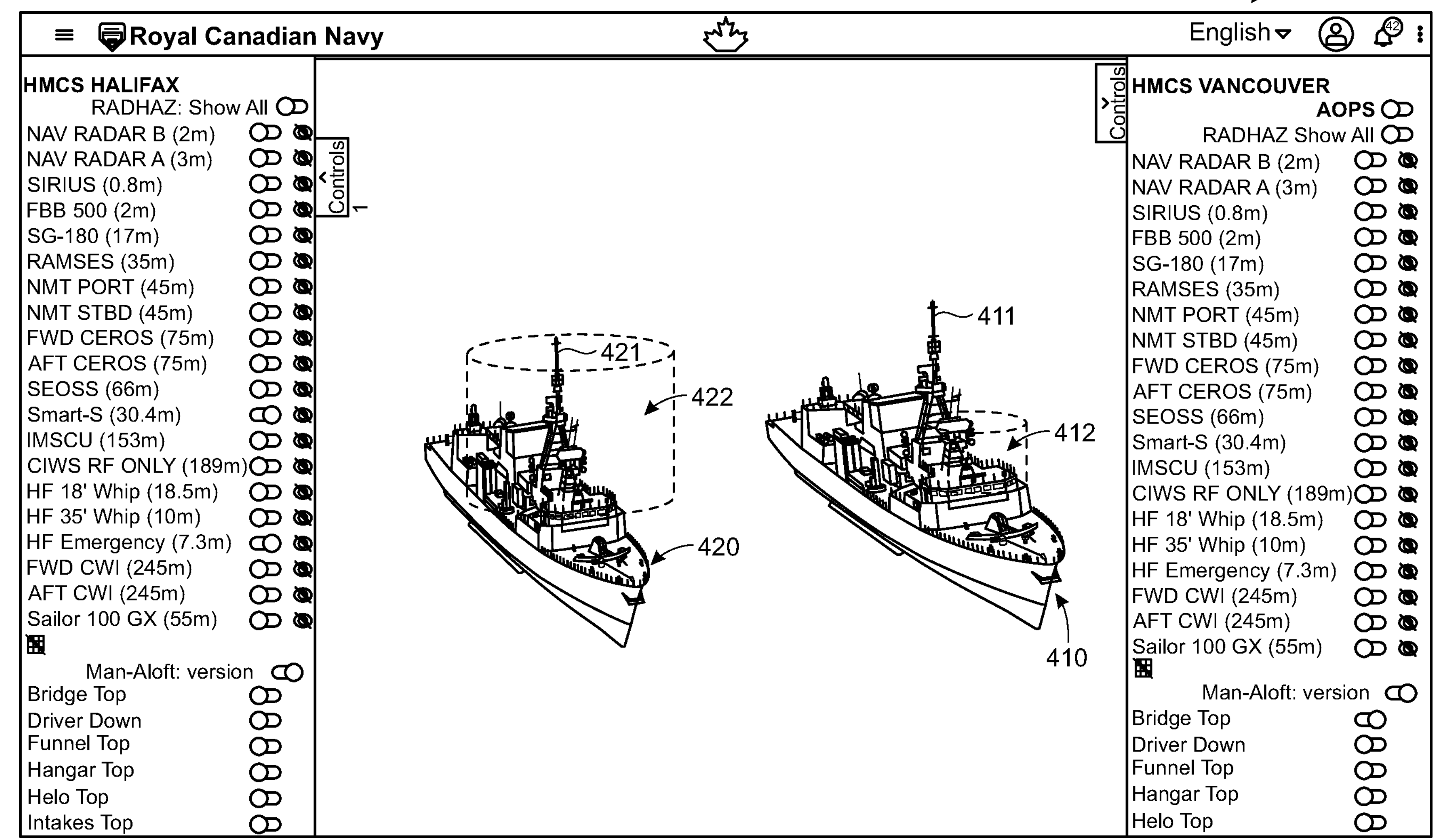
FIG. 7A is a screen shot of a predictive visualization of two ships generated for a navy shipyard application according to an implementation of the present disclosure.
Figure 7B:
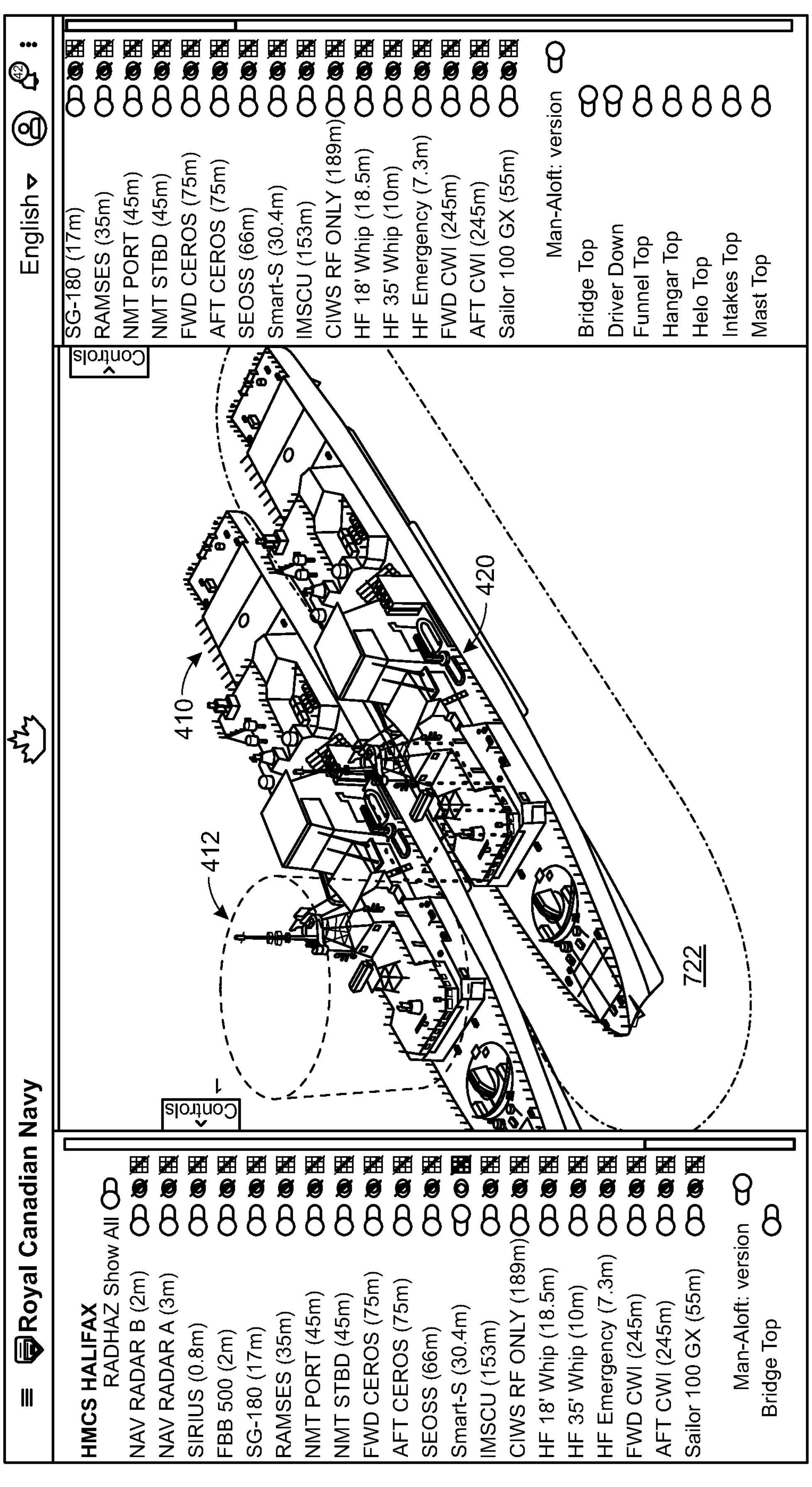
FIG. 7B is a screen shot of a predictive visualization generated for two ships in a navy shipyard and comprising a potential collision state according to an implementation of the present disclosure.
Figure 7C:
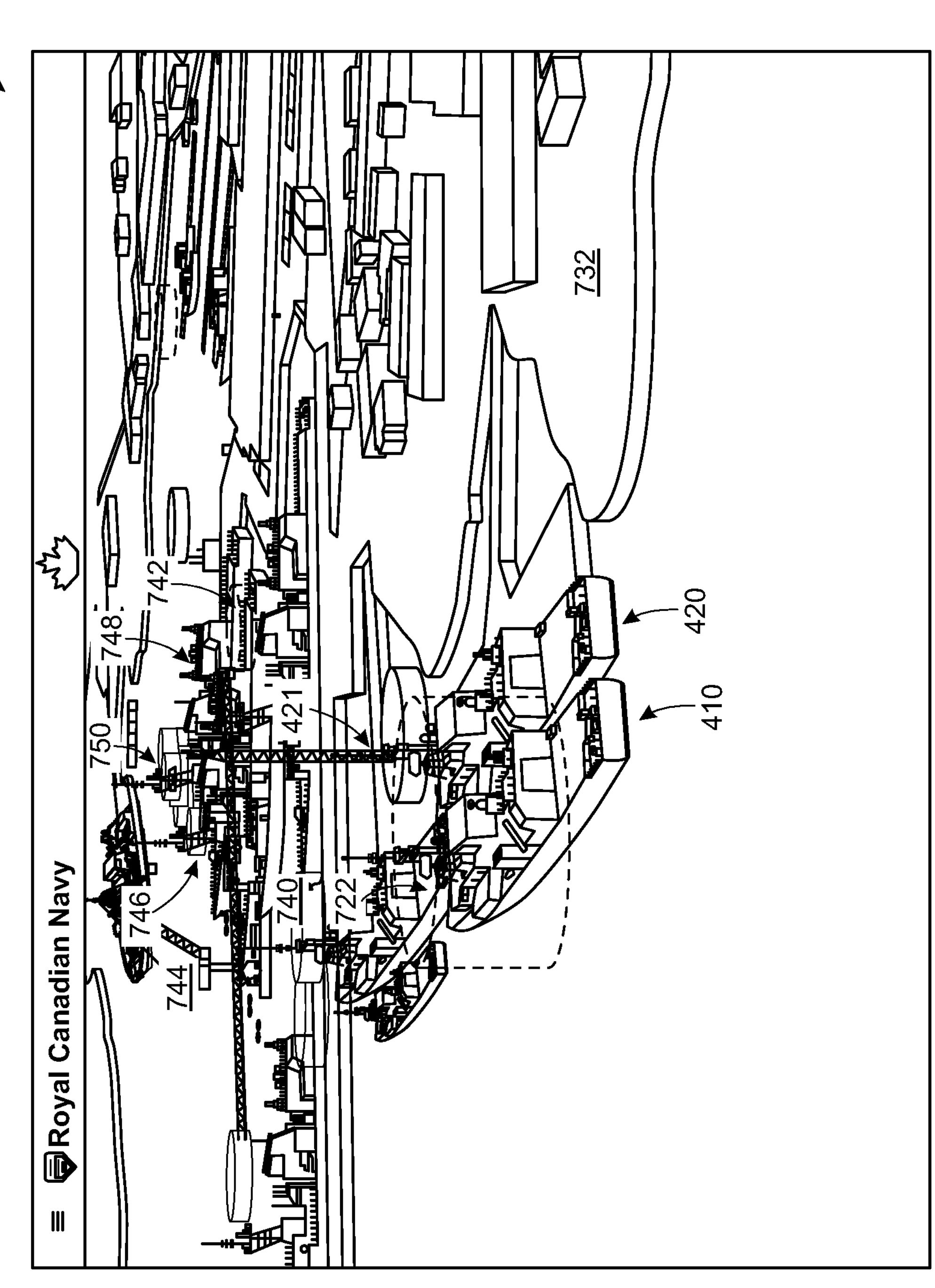
FIG. 7C is a screen shot of another predictive visualization for two ships in a navy shipyard and comprising a potential collision state according to an implementation of the present disclosure.

Referring back to FIG. 2A, once the 3D model(s) have been rendered, the user metaverse application 130 is configured to allow a user to create an activity, i.e. a radiating chit as indicated in block 202, utilizing a user application, for instance a Duty Watch application running on an application installed or located on the bridge of a ship. The application 130 is configured with a screen or window (pop-up) which is configured to allow a user to define and create a radiating chit as shown in FIG. 3 and indicated generally by reference 300. The radiating chit is utilized by the application to detect collision as will be described in more detail below. As shown in FIG. 3, the chit create window 300 comprises an evolution drop-down list 302, an emitter location input field or box 304, a date input field or box 306 and a time input comprising a start time input box 308 and an end time input box 309. The evolution drop-down 302 is configured to allow a user to select the type of activity comprising radiation, man-aloft and antenna rotation, according to an exemplary embodiment and implementation. The application is configured to check the radiation chit against any type of activity occurring and detected in the venue. The emitter location input 304 is configured to receive the location where the antenna is located, and where radiation is occurring. A radiation ray or mesh is visually drawn or generated at this location. A 3D rendering comprising two ships in a navy shipyard application is shown in FIG. 4 indicated by reference 400 and also in FIG. 7A and indicated generally by reference 710. The ships are indicated individually by references 410 and 420, respectively. The first ship 410 has an antenna indicated by reference 411 and as shown in the rendering the application has created a radiation ray or shape 412 in relation to the ship antenna 411. Similarly, the second ship 420 has an antenna indicated by reference 421, and the application has created a radiation ray or shape 422 in relation to the ship antenna 421, as depicted in the rendering displayed in the iFrame in FIG. 4. FIG. 7C shows another rendering of a 3D venue indicated by reference 730, with the two ships 410 and 420 docked beside each other in a Navy dockyard rendered in 3D and indicated generally by reference 732. The 3D venue 730 also includes additional ships (rendered as 3D objects) indicated by references 740, 744 and 748, with respective 3D radiating meshes indicated by references 742, 746 and 750, respectively. Referring back to FIG. 3, the date input 306 is configured to receive the day that a particular activity is scheduled, for instance, one of the ships 410, 420 is leaving port. The time inputs 308, 309 are configured to receive the start and end times, respectively, for the activity, for instance, one of the ships 410, 420 is leaving port between 8:00 am and 4:00 pm on the scheduled date. The date entered in 306, the start time entered in 308 and the end time entered in 309 are stored in the backend server 122.

Reference is made back to FIG. 2A, in block 204, the application is configured to perform or execute a function to check for a collision on the data layer. According to an exemplary implementation, the application is configured to retrieve the date and start and end times stored in the backend server 122 (FIG. 1), and check if there is any activity is scheduled at the same time of the day in decision block 206. If yes, then the application continues to check if the radiation activity might affect the activities scheduled. If no activity is scheduled, i.e. there is no other event happening at the same time of the day, then it is safe for the user to schedule an activity, i.e. a radiation activity, for one of the ships, for instance the ship 410 (FIG. 4) and is indicated in step 208 in FIG. 2A.

On the other hand, if the application determines in decision block 206 that an activity is scheduled at the same time, or there is an overlap in the activity times, then a radiating mesh is created from the source model as indicated in block 210. The radiating mesh comprises a shape (3D) that is generated by the application and positioned or placed on an anchor point in order to visualize the area affected by a radiation active. According to an exemplary implementation, the application is configured to use the dataUX model to generate a radiation activity comprising a 3D mesh or shape on the antenna position of a ship, for instance, when the radiation chit is created. For example, the rendering of the ship 410 in FIG. 4 comprises a 3D radiation activity shape or mesh 412 anchored or referenced to the antenna 411 of the ship 410. The 3D radiation activity mesh 412 is rendered and clearly visible on the venue 400 above the ship 412, e.g. the source model. According to another aspect, the application is configured to generate different 3D radiation activity meshes or shapes and/or anchor points on the 3D model based on the type or sort of activity. For a man-loft or overboard activity, for example, the application is configured to generate a 3D radiation shape that covers or is attached to the area interest on the vessel. Activities are typically represented by a 3D radiation activity mesh having a cylindrical shape as shown.

Figure 6A:
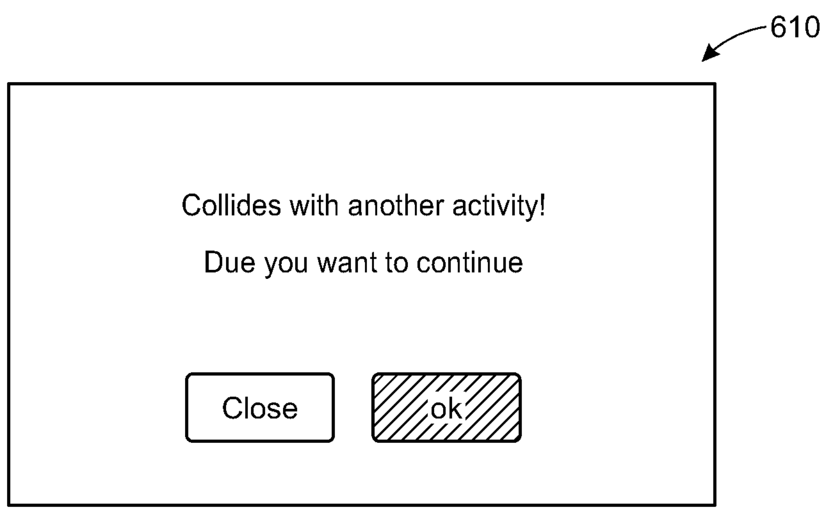
FIG. 6A is a screenshot of a screen or window generated by the message service in response to a collision detection according to an implementation of the present disclosure.
Figure 6B:
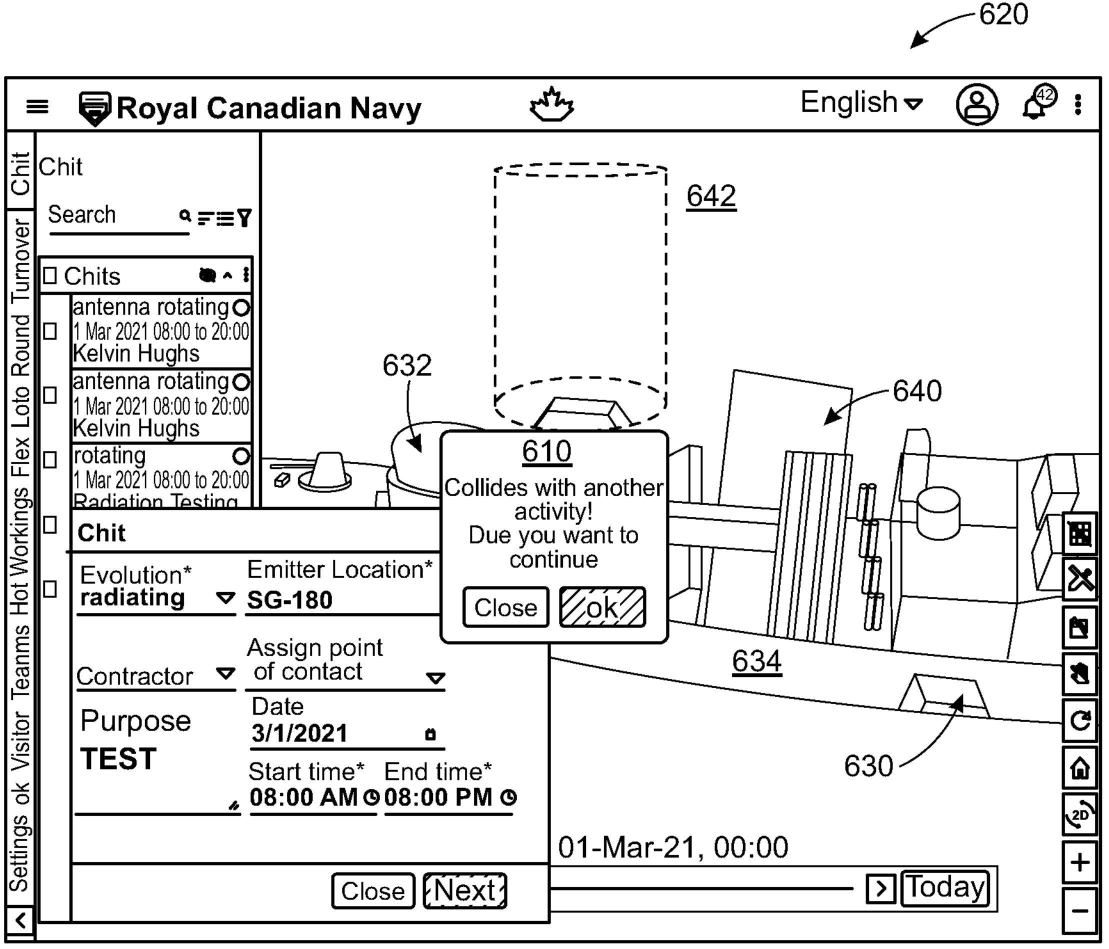
FIG. 6B is a screenshot of a 3D rendering of the collision in response to a collision detection according to an implementation of the present disclosure.

The user application is configured to perform a first level of collision detection as indicated in block 212. The first level collision detection comprises determining whether two or more objects in a scene or venue have come into contact with each other using a. bounding box. According to an implementation, the application is configured to utilize the default "bounding box" function in a gaming engine. According to an exemplary implementation, the application creates or generates a "bounding box" around each object in the scene. The bounding box comprises a 3D shape (for example, a cube or rectangular prism) that completely encloses the object. For instance, FIG. 7B shows a 3D rendering in an iFrame window indicated generally by reference 720 and comprising the first ship 410 and the second ship 420. As shown, the application has generated and rendered a bounding box 722 around the second ship 420. Similarly, the first ship 410 in FIG. 7C is rendered with a bounding box indicated by reference 722. The user application has rendered the bounding box 722 based on the overlapping activities, e.g. docked beside each other in the shipyard, of the first ship 410 and the second ship 420. When the scene is rendered, the application is configured to execute an algorithm or function to check if the bounding boxes of two or more objects intersect (i.e. overlap) with each other, as shown in decision block 214. If the application determines that there is no collision (decision block 214), then the activity continues as noted by the Proceed with Activity step in block 208. If a collision is detected in decision block 214, the application is configured to trigger a collision event and issues a "collision found" notification to the user, as indicated in block 218, and/or in the form of a collision pop-window as shown in FIG. 6A and indicated generally by reference 610. The application is further configured to visualize the collision, for instance, by generating a 3D rendering in the iFrame window for the 3D venue as indicated by reference 620 for a first ship 630 and a second ship 640, as depicted in FIG. 6B. As shown in FIG. 6B, the first ship object or model 630 is rendered with a radiating mesh 632, and further with a bounding box indicated by reference 634. The second ship object or model 640 is rendered with a radiating mesh 642. In response to the detection of a collision, the application is configured to display the collision pop-up window 610 in the iFrame window 620 to clearly notify the user.

According to an exemplary implementation, the algorithm executed by the application is configured to utilize the bounding box mechanism as described above. The bounding box mechanism provides an efficient mechanism to check for and detect a collision between two objects. However, it will be appreciated that since the bounding box utilizes an approximation of the object shape, there can be false-positive collision detections, for instance, if the object is not well aligned with the bounding box.

According to another embodiment, the application is configured to execute a more precise collision detection algorithm. As shown, the application determines if execution of the precise collision detection algorithm has detected a collision in decision block 216, if yes, then the application issues a "collision found" notification to the user, as indicated in block 218, and the application generates a rendering of the collision as noted in block 220.

According to an exemplary implementation, the precise collision detection algorithm is utilized as the next stage of collision detection once a collision has been found as indicated by decision block 216. In response to the detection of a collision, i.e. when two meshes collide, the precise collision detection algorithm is configured to execute or run a point-by-point overlay over them and flags the collision as soon as it detects it. This verifies whether a "bounding box" algorithm false-positive collision has occurred. Since point-by-point checking is an expensive operation in terms of computing resources, the precise collision detection algorithm is configured to first perform all data level and bounding box collision checks. Only if a collision between two meshes is discovered, the precision collision algorithm is applied to the two colliding meshes. Accordingly, collision detection performance and precision is improved. Once the collision is verified by the precise collision detection algorithm, the Collision Found notification in block 218 is generated, and the collision is visualized in block 220. If the precise collision detection algorithm does not find or confirm the existence of a collision, then the application allows the user to proceed with the activity, as depicted in block 208 in FIG. 2A.

According to another embodiment, the user application is configured to generate an alternate metaverse, i.e. 3D venue 152 (FIG. 1), utilizing the alternate metaverse application 150 (FIG. 1) as described above. In an exemplary implementation, for example, navy ships in a shipyard, using the user application, e.g. Duty Watch application, an officer enters activities associated with their ship and only sees the activities taking place on their vessel, for example, the first ship 410 (FIG. 4). However, activity taking place on another vessel, for example, the second ship 420 (FIG. 4), can potentially impact the activity of the first ship 410 (FIG. 4). Any other activity taking place on a neighboring vessel may be impacted by the action. In order to anticipate such collisions and operate to prevent them, the alternate metaverse application 130 (FIG. 1) is configured to generate and render an alternate metaverse. According to an exemplary implementation, the alternate metaverse is rendered on a separate iFrame window, which is hidden from the user, e.g. the officer. The alternate metaverse includes all the activities as created by the user, e.g. the officer.

Figure 5:
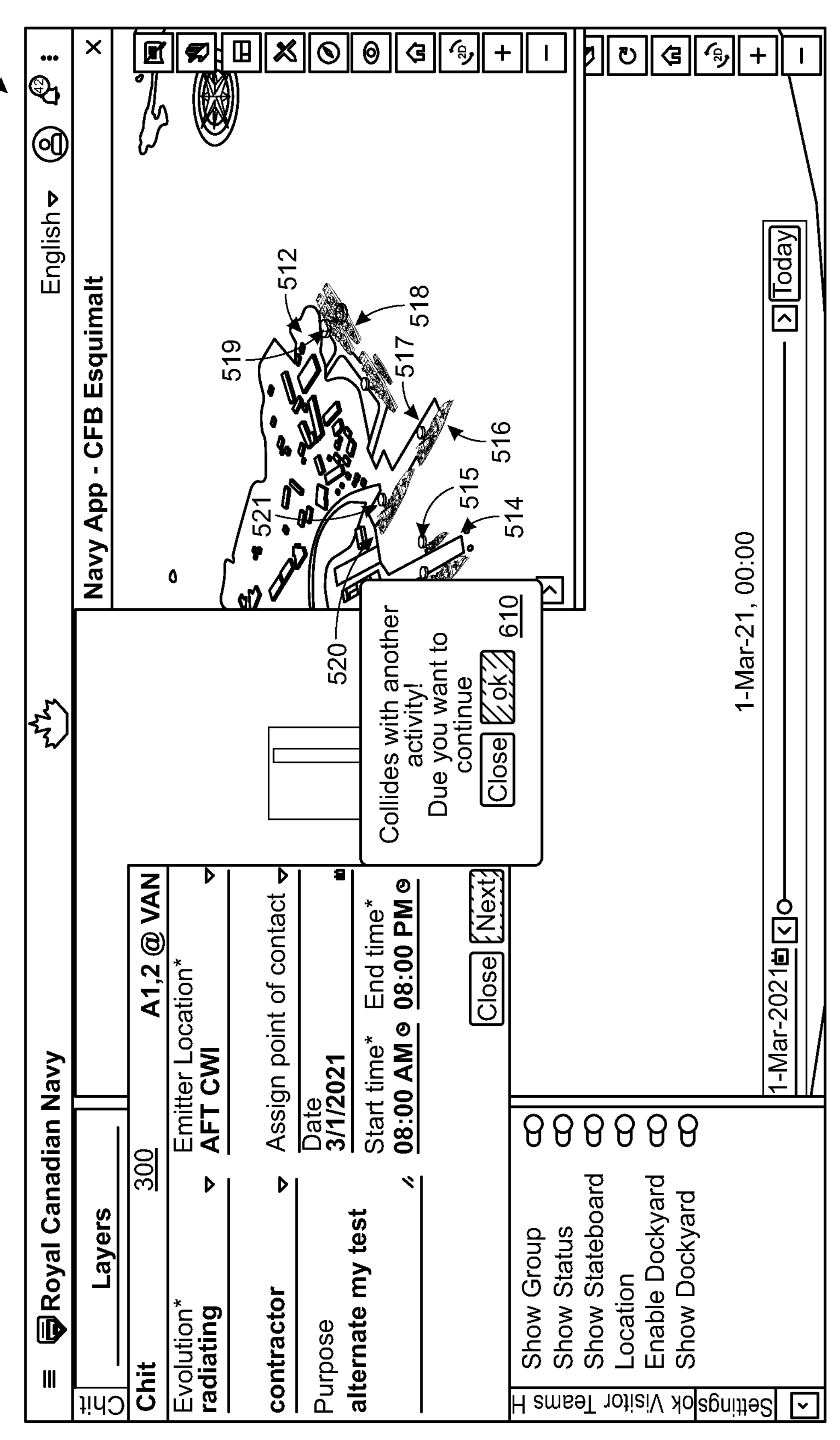
FIG. 5 is a screenshot of a 3D rendering of a navy shipyard in an iFrame window according to an implementation of the present disclosure.

Reference is made to FIG. 5, which shows an exemplary implementation of the alternate metaverse according to an embodiment of the present disclosure. As described above, the alternate metaverse application 140 is configured to generate a rendering of an alternate metaverse in an iFrame window, as indicated generally by reference 500. The iFrame window 500 is hidden from the user, e.g. an officer, and according to an exemplary implementation comprises a 3D rendering or venue of Navy shipyard, e.g. CFB Esquimalt dockyard, as indicated by reference 510. The 3D venue 510 comprises a rendering of the dockyard 512, a first ship or vessel 514, a second ship or vessel 516. The user application is configured to allow the user to view the alternate metaverse, i.e. the hidden iFrame window, by changing administrator "admin" settings. The iFrame window 500 can be configured to display the radiating chit configuration window 300 (FIG. 3) as a pop-up, as shown in FIG. 5. The current metaverse's collision detection confirms whether the current activity conflicts with any other activity taking place inside the vessel. The same radiation activity is scheduled and visualized at the Navy dockyard in the alternate metaverse to determine whether it has any effects on nearby vessels or other activities taking place in the dockyard. This is the only way we can determine whether the scheduled activity at present is having an effect on any other dockyard operations. Through this iFrame window, the officer can see what activity is having an impact on the dockyard, and if the officer needs to reprioritize his activity in relation to other activities, he will issue a request.

Referring back to FIG. 2A, according to an exemplary implementation, the alternate metaverse 130 is invoked by a broadcast message from the message services module 149 (FIG. 1) as indicated in block 211. In response, the alternate metaverse application 130 generates a 3D venue 132 (FIG. 1) for example as depicted in the iFrame window 500 FIG. 5 and indicated by reference 510. The alternate metaverse application is configured to perform a first level collision detection as indicated in decision block 217. As described above, the first level collision detection comprises determining whether two or more objects in the alternate metaverse, e.g. scene or venue, have come into contact with each other using a bounding box. If the application determines that there is no collision (decision block 217), then the application moves to a clean-up operation and ends execution as indicated in block 222. If a collision is detected in decision block 217, then the application is configured to execute a precise collision detection algorithm (as described above) and indicated by decision block 219. If the precise collision detection algorithm does not find or is unable to confirm the collision detected in decision block 217, then the application proceeds to the clean-up operation in block 222 and terminates or ends. If, on the other hand, the precise collision detection algorithm 219 finds or confirms the collision, then the application is configured to broadcast a collision found message to the user metaverse application 140 (FIG. 1) as indicated in block 221. In response, the user application generates a "collision found" notification to the user, in the form of collision found pop-window 610 in FIG. 6A. The application is further configured to visualize the collision, by generating the 3D rendering in the iFrame window 620 for the 3D comprising the first ship 630 and the second ship 640, as depicted in FIG. 6B. As shown in FIG. 6B, the first ship object or model 630 is rendered with a radiating mesh 632, and further with a bounding box indicated by reference 634. The second ship object or model 640 is rendered with a radiating mesh 642. In response to the detection of a collision, the application is configured to display the collision pop-up window 610 in the iFrame window 620 to clearly notify the user.

According to another exemplary embodiment, the alternate metaverse venue 132 may be rendered utilizing a separate application running on the server (rather than an application program executed through the web browser on a client machine or device). The application is configured to utilize a "load null" method adapted from a gaming engine, as indicated in block 215. According to an exemplary implementation, the alternate metaverse is rendered by the game engine in the background. According to another aspect, the server is utilized to apply the same collision detection mechanism as described above for the user application. It will be appreciated that this implementation allows the processing load to shift from the web browser running on the client machine to the server. This in turn enhances the performance of the user application running as a browser application on the client machine by reducing the processing requirements. This technique has the advantage of shifting the load from the client browser to the server. This enhances the performance of the browser application. In order to maintain the performance, the server application and resources are suitably scaled based on the number of potential concurrent users at any one time.

Figure 8:
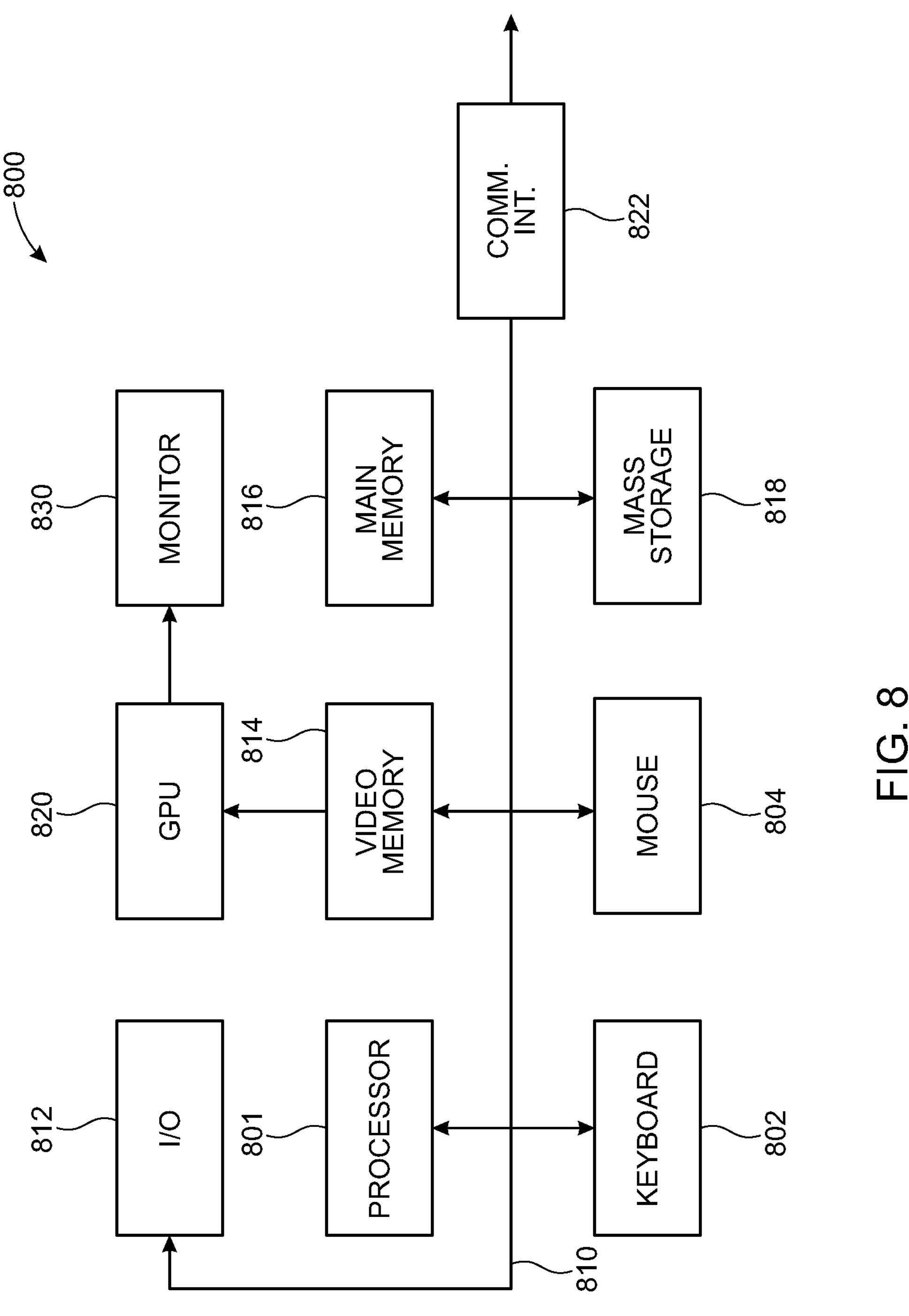
FIG. 8 is a block diagram showing an exemplary implementation for a computer system suitable for implementing the system of FIG. 1.

Reference is next made to FIG. 8, which shows an exemplary implementation of a computer system 800 according to an embodiment and suitable for implementing the system and the other embodiments as described herein.

As shown, the computer system 800 comprises a processor 801 and a keyboard 802 and mouse 804 coupled to the processor 801 via a system bus 810. The keyboard 802 and the mouse 804, in one example, allow a user to introduce or provide inputs to computer system 800 and the processor 801, for instance, using the user interface (GUI). It will be appreciated that other suitable input devices may be used in addition to, or in place of, the mouse 804 and/or the keyboard 802. The computer system 800 may be configured with other input/output (I/O) devices 812 coupled to the system bus 810, for example, additional display monitor(s), a printer, audio/video (A/V) I/O, etc.

The processor 801 comprises at least one processor implemented in hardware, or at least in part in hardware, and may further comprise processor modules configured in hardware or in a combination of hardware and software/firmware configured to provide the functions or functionality as described herein.

According to another aspect, the computer system 800 may include a video memory module 814, a main memory module 816 and a mass storage device 818, which are coupled to the system bus 810. The mass storage device 818 may include both fixed and removable media, such as solid state, optical or magnetic optical storage systems and any other available mass storage technology. The system bus 810 may be configured, for example, with address lines for addressing the video memory 814 and/or the main memory 816.

According to another aspect, the system bus 810 may include a data bus for transferring data between and among the components, such as the processor 801, the main memory 816, the video memory 814 and/or the mass storage device 818. The video memory 814 may be a dual-ported video random access memory. One port of the video memory 814, in one example, is coupled to a graphics processor unit (GPU) 820 or integrated as an on-chip resource, which is used to visually render graphical elements and models for display on one or more display monitor(s) indicated generally by reference 830. The monitor(s) 830 may be any type of monitor suitable for displaying graphic images, such as a flat panel display or monitor, or liquid crystal display (LCD) monitor, a cathode ray tube monitor (CRT), or any other suitable data presentation device. The processor 801 may be implemented utilizing any suitable microprocessor or microcomputer.

According to another aspect, the computer system 800 may include a communication interface 822, which is coupled to the system bus 810. The communication interface 822 provides a two-way data communication coupling via a network link. For example, the communication interface 822 may be a satellite link, a local area network (LAN) card, Internet router, a cable modem, and/or wireless interface. In any such implementation, the communication interface 822 is configured to send and/or receive electrical, electromagnetic or optical signals that carry digital data representing various types of information.

According to another aspect, code received by the computer system 800 may be executed by the processor 801 as the code is received, and/or stored in the mass storage 818, or other non-volatile storage for later execution. In this manner, the computer system 800 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices. Regardless of the actual implementation of the computer system 800, the data processing system may execute operations and functions as described herein.

The functionality and features associated with the predictive visualization system 110, the digital twin module 120, the visualization generation module 130, the user metaverse application 140, the alternate metaverse application 150, the platform 104 for user machines/devices 102, the executable processes and functions (FIGS. 2A-2B) and/or the user interface screens or iFrame windows or digital visualizations for the predictive visualization system (FIGS. 3 to 7) as described above and in accordance with the embodiments may be implemented in the form of one or more software objects, components, or computer programs or program modules in the server and/or the client machines. Further, at least some or all of the software objects, components or modules can be hardcoded into processing units and/or read only memories or other non-volatile storage media in the mobile communication device, server and/or other components or modules depicted in the drawings. The specific implementation details of the software objects and/or program modules will be within the knowledge and understanding of one skilled in the art.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

LIST OF REFERENCE NUMERALS

100—system operating environment and configuration
102—clients or users
103—client/user devices
104—cloud-based platform or portal
105—authentication layer or component
106—app registration component or module
107—active directory for registered or enabled clients/users
109—nginx PWA
110—predictive visualization system
120—digital twin module
122—backend server
123—configuration data
124—non-SQL server
125—3D assets data
130—visualization generation engine
131—DATAUX View component
132—physics engine
134—camera & lights module
140—user metaverse application
141—front-end interface component
142—collection module
143—notifications module
144—collaboration module
145—3D controls module
146—3D state module
147—3D venue module
149—message broadcasting service
150—alternate metaverse application
152—3D venue in alternate metaverse
160—external connectors module
161—external connectors interface
162—IDE PLMS hybrid multi-source real-time
164—REST API connector
166—web socket connector
167—Spreadsheet updater
168—IOT connector
200—predictive visualization process or method
201—load venue
202—user creates activity, e.g. a radiating chit
203—load datascape
204—check collision on data layer
205—set lighting and camera
206—check if any activity is scheduled at same time
208—proceed with activity
210—create radiating mesh from source model
211—broadcast check collision message to alternate metaverse

212—check collision on visible mesh models
213—render alternate metaverse on iFrame
214—if collision found decision block
215—load null with basic data
216—if collision found on precision algorithm decision block
217—if collision found decision block
218—notify user with "Collision Found" state
219—if collision found on precision algorithm decision block
220—visualize "collision"
221—broadcast "collision found" message to user metaverse
222—digital "garbage" cleanup
250—load venue function or process
251—load canvas
252—get canvas data
254—get project settings
256—start DataUX
258—load light & camera
260—create static model(s)
262—create dynamic model(s)
264—listeners/sockets
266—decode message
268—modify/animate models
300—radiation chit create window
302—evolution drop-down list
304—emitter location input box
306—date input box
308—start time input box
309—end time input box
400—3D rendering of two ships
410—first ship
411—first ship antenna
412—first ship radiation mesh
420—second ship
421—second ship antenna
422—second ship radiation mesh
500—alternate metaverse rendering
510—3D venue rendering
512—3D rendering of dockyard
514—ship object or 3D model rendering
515—radiating mesh for ship object (514)
516—ship object or 3D model rendering
517—radiating mesh for ship object (516)
518—ship object or 3D model rendering
519—radiating mesh for ship object (518)
520—ship object or 3D model rendering
610—collision found pop-up window
620—alternate metaverse rendering
630—first ship object rendering
632—radiation mesh for first ship (630)
634—bounding box for first ship (630)
640—second ship object rendering
642—radiation mesh for second ship (640)
710—3D rendering of exemplary shipyard in an iFrame window
720—3D rendering in an iFrame window
722—bounding box for first ship
730—shipyard rendering or venue
732—dockyard rendering or venue
740—docked ship
742—radiation mesh for docked ship (740)
744—docked ship
746—radiation mesh for docked ship (744)
748—docked ship
750—radiation mesh for docked ship (748)
800—exemplary computer system and hardware components/resources
801—processor
802—keyboard
804—mouse
810—bus
812—I/O module or interface
814—video memory
816—main computer memory
818—mass storage device(s)
820—graphics processing unit (GPU)
822—communication interface or port
830—display monitor or panel

What is claimed is:

1. A computer-implemented process for predictive visualization in an industrial application, said computer-implemented process comprising:

loading a venue comprising a digital rendering of the industrial application and comprising a plurality of digital models representing objects in the industrial application;

creating a radiating chit based on a user defined activity for each of said plurality of digital models in said venue;

generating an instance of a data layer corresponding to said venue;

determining if any of said user defined activities are scheduled on overlapping times, and if none of said user defined activities are scheduled on time, proceeding with said user defined activity, and if any one of said user defined activities are scheduled on time, creating a radiating mesh based on said defined activity for each of said digital models defined in said venue;

utilizing said radiating meshes to determine a collision, if a collision is not found, proceeding with said user defined activity;

if a collision is found, performing a collision detection to determine if two or more of said objects in said venue have come into contact;

generating a collision detected state if said two or more objects have come into contact; and generating a collision found notification and sending said collision found notification to one more users associated with said venue.

2. The computer-implemented process as recited in claim 1, further including determining a collision based on a precise collision detection process after a collision is detected.

3. The computer-implemented process as recited in claim 1, further including creating an alternate digital rendering of said venue including said digital models and said associated radiating meshes, and said alternate digital rendering being configured to be normally hidden from the user, and including determining a collision in an alternate digital venue rendering based on said corresponding radiating meshes.

4. The computer-implemented process as recited in claim 3, further including determining a collision based on a precise collision detection process after a collision is detected in said alternate digital venue comprising executing a point-by-point overlay on the radiating meshes of two digital models, and if a collision is detected broadcasting a collision found message to one or more users associated with said venue.

5. A computer program product for predictive visualization in an industrial application, said computer program product comprising:

a storage medium configured to store computer readable instructions;

said computer readable instructions including instructions for, loading a venue comprising a digital rendering of the industrial application and comprising a plurality of digital models representing objects in the industrial application;

creating a radiating chit based on a user defined activity for each of said plurality of digital models in said venue;

generating an instance of data layer corresponding to said venue;

determining if any of said user defined activities are scheduled on overlapping times, and if none of said user defined activities are scheduled on time, proceeding with said user defined activity, and if any one of said user defined activities are scheduled on time, creating a radiating mesh for each of said digital models defined in said venue;

utilizing said radiating meshes to determine a collision, if a collision is not found, proceeding with said user defined activity, and if a collision is found, notifying the user about the collision; and visualizing the collision on said venue.

6. The computer program product as claimed in claim 5, further including computer readable instructions for determining a collision based on a precise collision detection process after a collision is detected.

7. The computer program product as claimed in claim 6, further including computer readable instructions for creating an alternate digital rendering of said venue including said digital models and said associated radiating meshes, and said alternate digital rendering being configured to be normally hidden from the user, and including the step of determining a collision in an alternate digital venue rendering based on said corresponding radiating meshes.

8. The computer program product as claimed in claim 7, further including computer readable instructions for determining a collision based on a precise collision detection process after a collision is detected in said alternate digital venue, and if a collision is detected broadcasting a collision found message to said venue.

9. A system for predictive visualization in an industrial application, said system comprising:

a process configured to load a user venue comprising a digital rendering of the industrial application and comprising a plurality of digital models representing objects in the industrial application;

a process configured to create a radiating chit based on a user defined activity for each of said plurality of digital models in said user venue;

a process configured to generate an instance of a data layer corresponding to said user venue;

a process configured to determine if any of said user defined activities are scheduled on overlapping times, and if none of said user defined activities are scheduled on time, proceeding with said user defined activity, and if any one of said user defined activities are scheduled on overlapping times, said process being configured to create a radiating mesh for each of said respective digital models in said venue;

a process configured to determine a collision between one or more of said digital models utilizing said radiating meshes, if a collision is not found, proceeding with said user defined activity, and said being configured to issue a notification if a collision is found; and a process configured to visualize the collision on the digital rendering of said user venue and comprising a collision pop-up window configured to be displayed in said user venue.

10. The system as claimed in claim 9, further including a precise collision detection process configured to determine a collision utilizing a precise collision detection process after a collision is detected.

11. The system as claimed in claim 10, further including a process configured to create an alternate digital rendering of said venue including said digital models and said associated radiating meshes, and said alternate digital rendering being configured to be normally hidden from the user, and further including a process configured to determine a collision in an alternate digital venue rendering based on said corresponding radiating meshes.

12. The system as claimed in claim 11, further including a process configured to determine a collision based on a precise collision detection process after a collision is detected in said alternate digital venue, and further including a process configured to broadcast a collision found message to said venue.

13. A computer-implemented process for predictive visualization in an industrial application, said computer-implemented process comprising:

generating a user metaverse for the industrial application, said user metaverse comprising a digital rendering of the industrial application and a plurality of digital models representing objects in the industrial application;

creating an activity for each of said objects and a corresponding radiating mesh;

generating an instance of a data layer for said metaverse, said data layer instance including said activity for each of said objects;

detecting if there is a collision based on an overlap between two of said activities in said data layer instance;

if there is a collision detected, broadcasting a check collision to an alternate metaverse, said alternate metaverse being rendered and including the objects in said user metaverse, and said alternate metaverse being normally hidden from said user;

performing a first level collision detection comprising determining if said two objects have come into contact in said alternate metaverse;

if a first level collision is detected, performing a second level collision detection, and if said second level collision detection confirms the collision, then generating a collision found notification; and sending said collision found notification to said user metaverse.

14. The computer-implemented process as claimed in claim 13, wherein said first level collision detection comprises utilizing a bounding box to determine if said two objects have come into contact.

15. The computer-implemented process as claimed in claim 13, wherein said second level collision detection comprises executing a point-by-point overlay on the radiating meshes of said two objects, and if said second level collision detection verifies the collision, generating said collision found notification.

16. The computer-implemented process as claimed in claim 15, wherein said user metaverse is configured to generate and display a collision pop-up window in response to said collision found notification from said alternate metaverse.

17. A computer system for predictive visualization in an industrial application, said system comprising:

a process configured to generate a metaverse for the industrial application, said metaverse comprising a digital rendering of the industrial application and a plurality of digital models representing objects in the industrial application;

a process configured to create an activity for each of said objects and a corresponding radiating mesh;

a process configured to generate an instance of a data layer for said metaverse, said data layer instance including the activity for each of said objects;

a process configured to detect if there is a collision based on an overlap between two of said activities in said data layer instance;

a process configured to broadcast a check collision to an alternate metaverse if a collision is detected, said alternate metaverse being rendered and including the objects in said metaverse, and said alternate metaverse being normally hidden from a user;

a process configured to perform a first level collision detection comprising determining if said two objects have come into contact in said alternate metaverse;

a process configured to perform a second level collision detection if a first level collision is detected, and if said second level collision detection confirms the collision, then generating a collision found notification; and sending said collision found notification to said metaverse.

18. The computer system as claimed in claim 17, wherein said first level collision detection comprises utilizing a bounding box to determine if said two objects have come into contact.

19. The computer system as claimed in claim 17, wherein said second level collision detection comprises executing a point-by-point overlay on the radiating meshes of said two objects, and if said second level collision detection verifies the collision, generating said collision found notification.

20. The computer system as claimed in claim 19, wherein said metaverse is configured to generate and display a collision pop-up window in response to said collision found notification from said alternate metaverse.

* * * * *